March 7, 1967 T. H. ANDERSON 3,307,845

DOCUMENT SYNCHRONIZING AND INDEXING CONTROL APPARATUS

Filed Oct. 12, 1964 5 Sheets-Sheet 1

INVENTOR
THEODORE H. ANDERSON

BY Donald F. Voss

ATTORNEY

DOCUMENT SYNCHRONIZING AND INDEXING CONTROL APPARATUS

Filed Oct. 12, 1964

March 7, 1967 T. H. ANDERSON 3,307,845

DOCUMENT SYNCHRONIZING AND INDEXING CONTROL APPARATUS

Filed Oct. 12, 1964 5 Sheets-Sheet 4

United States Patent Office
3,307,845
Patented Mar. 7, 1967

3,307,845
DOCUMENT SYNCHRONIZING AND INDEXING CONTROL APPARATUS
Theodore H. Anderson, Rochester, Minn., assignor to International Business Machines Corporation, New York, N.Y., a corporation of New York
Filed Oct. 12, 1964, Ser. No. 403,230
14 Claims. (Cl. 271—57)

This invention relates to control apparatus for document transports and more particularly to control apparatus including apparatus for coupling a control element to the transport in synchronism with the document to provide control signals for controlling the transport.

This invention finds particular utility in machines where documents are fed one at a time in seriatim asynchronously from a stack of documents to a document reading station and where the documents at the reading station are indexed in predetermined increments through the reading station and then transported from the reading station to a document stacker. The leading edge of the document is detected just prior to its entry into the reading station. This detection generates a control signal which is utilized to stop the transport. After a predetermined delay, to permit the stopped transport to settle down, an emitter disc is coupled to the stopped transport by means of a clutch. Upon completion of reading a portion of the document, an indexing signal starts the transport. The emitter disc will now turn in exact synchronism with the transport because it is clutched thereto. Further, it will move in synchronism with the leading edge of the doucement because its home position was synchronized with the document's leading edge as the document came to rest in the reading station.

As the emitter is turned a predetermined arcuate distance by the transport, it generates a signal which is applied to stop the transport. Thus the document is stopped with a new portion thereof in the reading position and the emitter is still synchronized to the document's leading edge. The number of times a document is indexed within the reading station can be varied as desired by changing the positions at which signals are generated by the emitter. After the document leaves the reading station, the emitter becomes decoupled from the transport so it can become synchronized with the leading edge of the next document.

Additionally, an emitter signal can be logically inhibited if it is desired to eject a document from the reading station. For example, if the error rate for reading a document were quite high on the first part of the document, it might be advisable to reject the entire document by ejecting it from the reading station and entering it into a reject pocket. Under this condition, any signal from the emitter would be inhibited and the emitter would be decoupled from the transport.

Accordingly, it is a principal object of this invention to provide improved control apparatus for document transports.

Another object of the invention is to provide improved control apparatus for a document transport which is synchronized to documents fed asynchronously.

Still another very important object of the invention is to provide improve document transport control apparatus which enables asynchronously fed documents to be precisely indexed in predetermined increments through a work station.

Yet another object of the invention is to provide improved document transport control apparatus which provides for both indexing and ejecting documents from a work station.

The foregoing and other objects, features and advantages of the invention will be apparent from the following more particular description of a preferred embodiment of the invention, as illustrated in the accompanying drawings.

Figure 1:
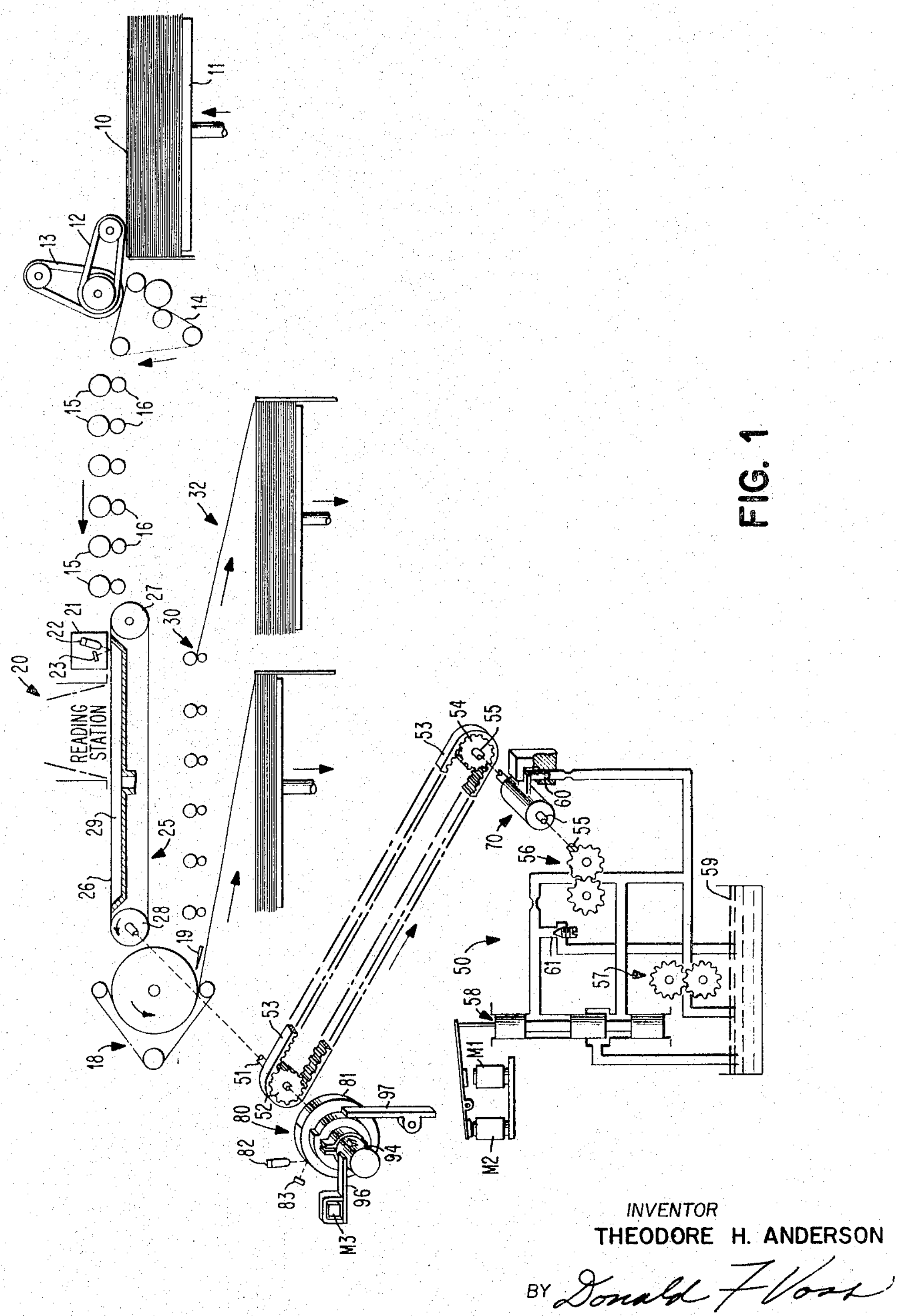
FIG. 1 is a schematic diagram of the document transport path, the document transport and the document transport control apparatus.

With reference to the drawings and particularly to FIG. 1, the invention is illustrated by way of example as including apparatus for feeding documents 10 one at a time in seriatim to reading station 20 and from there to one of two stackers of stacking station 30. The documents 10 are arranged in a stack upon a vertically movable platform so that the uppermost document of the stack engages a picker belt 12. As the documents advance from the stack, the platform 11 moves upwardly so as to maintain the uppermost document of the stack in contact with the picker belt 12.

The document picked by belt 12 enters between feed belt 13 and restraint belt 14. Feed belt 13 functions to feed a single document forward while restraint belt 14 functions to prevent additional documents from feeding along with the document fed by belt 13. This document picking and feeding apparatus can be of the type shown and described in U.S. Patent 2,989,307, dated June 20, 1961, for Sheet Feeding Apparatus, by J. A. Weidenhammer. The documents fed forward by belt 13 enter between a series of aligner rolls 15 and cooperating feed rolls 16. The aligner rolls 15 are slotted discs of the type shown and described in patent application Serial No. 172,463, filed February 12, 1962, now Patent No. 3,148,877, for Sheet Driving and Aligning Mechanism by D. W. Brearley and assigned to the same assignee as for the present invention. It is thus seen that the aligner rolls 15 and the cooperating feed rolls 16 function to feed the document forward to the reading station 20 in an aligned condition.

The documents 10 are transported within and brought to rest at the reading station 20 by means of a vacuum document transport 25 which is of the type shown and described in the IBM Technical Disclosure Bulletin, vol. 6, No. 9, dated February 1964, on page 65 thereof. The vacuum document transport 25 consists of a series of laterally spaced endless perforated belts 26 trained about pairs of longitudinally spaced pulleys 27 and 28. The documents 10 adhere to belts 26 due to vacuum in chamber 29. Pulley 28 is driven by a hydraulic drive 50.

The pulley 28 is fixed to a shaft 51 so as to rotate therewith. The shaft 51 also has a toothed pulley 52 fixed thereto. A toothed driving belt 53 is trained about pulley 52 and a toothed drive pulley 54 which is fixed to drive shaft 55. The drive shaft 55 is attached to hydraulic motor 56 to be driven thereby. The hydraulic motor 56 is driven by hydraulic pump 57 The operation of the motor 56 is under control of a suitable spool valve 58 which is positionable by start and stop magnets M1 and M2 respectively. With the valve 58 in the position shown, the motor is stopped because the valve 58 prevents fluid from flowing from the motor 56 to the reservoir 59. With the valve 58 in this position, the fluid by-passes the motor and flows directly to the reservoir 59. When the start magnet M1 is energized, the valve 58 is shifted downwardly to a position where fluid can flow from the motor 56 to the reservoir 59 and hence motor 56 will operate as fluid is supplied to it from the suitably driven pump 57. Fluid conductor 61 functions as a deceleration bleed line which provides a highly restrictive path to fluid flow from the motor 56 to the reservoir 59. The shaft 55 is held in a stop position after the motor 56 stops by means of a helical spring brake 70, which will be described in greater detail later herein. Suffice it to say at this time that the brake 70 is released by piston 60 as motor 56 operates.

The start and stop magnets M1 and M2 are controlled from several sources. Initially, when the machine is started, a GO signal of momentary duration is developed by system control unit 100, FIG. 5. The GO signal is passed by a logical OR circuit 101 to set latch 102. The set output of latch 102 is connected to energize magnet driver 103 which in turn energizes magnet M1. With the magnet M1 energized, the valve 58, FIG. 1, is shifted whereby motor 56 operates the drive shaft 55 which in turn drives shaft 51 through pulley 54, belt 53 and pulley 52. Thus, pulley 28 is driven by shaft 51, and the perforated belts 26 are thus driven.

Figure 4:
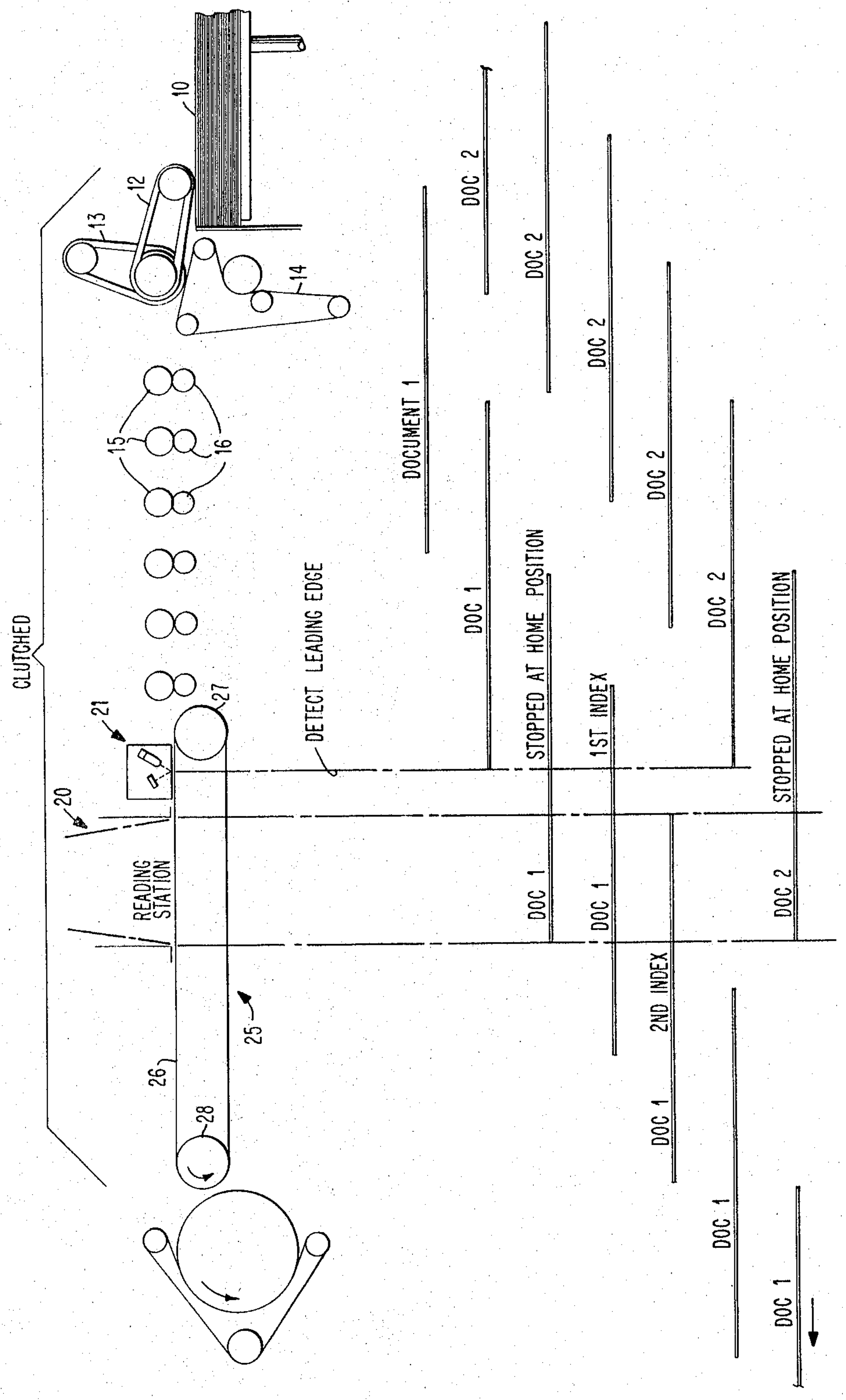
FIG. 4 is a schematic diagram illustrating the flow of documents from the hopper to the reading station, through the reading station and on to the stacker; and, FIG. 5 is a schematic circuit diagram for the control circuitry.

The documents 10 are delivered to belts 26 by aligner rolls 15 and cooperating feed rolls 16. As the belts 26 carry a document into the reading station 20, the leading edge of the document then passes underneath a leading edge document detector 21 consisting of a light source 22 and a light sensitive element 23. Document leading edge detector 21 develops a signal when it detects the leading edge of the document 10 and this signal, after a predetermined delay, functions to energize the stop magnet M2 thus stopping the motor 56 and in turn stopping the document 10 with the leading edge thereof at a predetermined position within the reading station 20 as shown in FIG. 4.

The document 10 is read while stationary. It can be read by any suitable reading device and in this instance, it is assumed that the document is read by an optical reader employing a flying spot scanner. The optical reader is not shown because it does not pertain to the invention. It should also be recognized that the reading station 20 can be any type of work station such as a punching or printing station.

Figure 5:
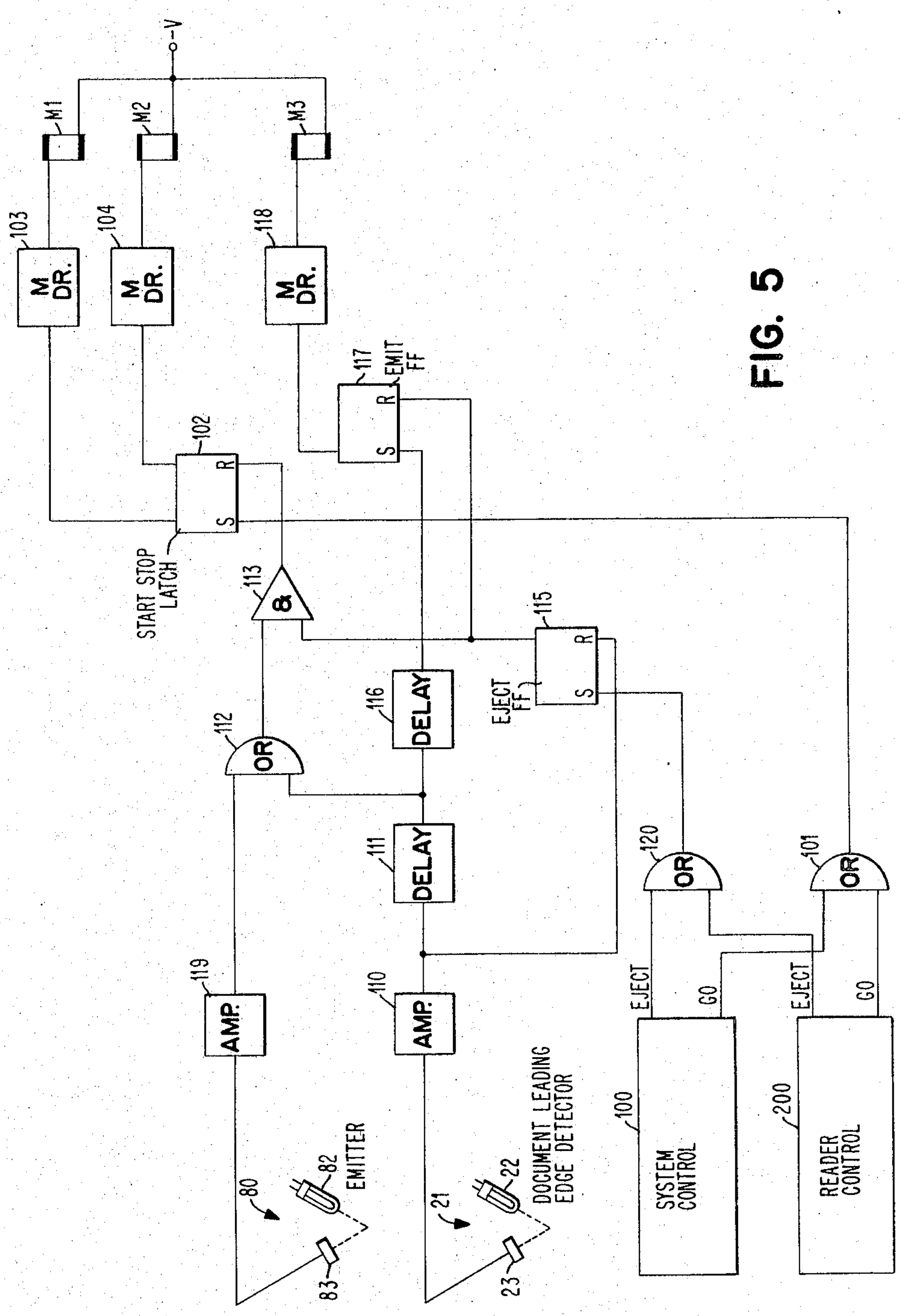

With reference to FIG. 5, it is seen that the output of the light sensitive element 23 is connected to the input of an amplifier 110. The output of the amplifier 110 is connected to the input of a delay element 111. The output of the delay element 111 is connected to an input of a logical OR circuit 112 which has its output connected to an input of logical AND circuit 113. Logical AND circuit 113 also has an input connected to the reset output of eject flip-flop 115. The reset terminal of eject flip-flop 115 is connected to the output of amplifier 110. Hence, whenever the leading edge of a document 10 is detected by detector 21, the eject flip-flop 115 is reset thereby conditioning logical AND circuit 113.

After a short delay as determined by delay 111, the logical AND circuit 113 will pass a pulse to reset the start-stop latch 102. The reset output of the start-stop latch 102 is connected to magnet driver 104 which in turn is connected to energize stop magnet M2.

The output of delay element 111 is also connected to the input of delay element 116 which has its output connected to the set input of emit flip-flop 117. The set output of flip-flop 117 is connected to magnet driver 118 which in turn is connected to energize an emitter clutch control magnet M3. Hence, it is seen that after the document 10 has been stopped with its leading edge at a predetermined position within the reading station 20, emitter clutch control magnet M3 will be energized whereby an emitter disc 81 of emitter 80 is coupled to the shaft 51.

Figure 2:
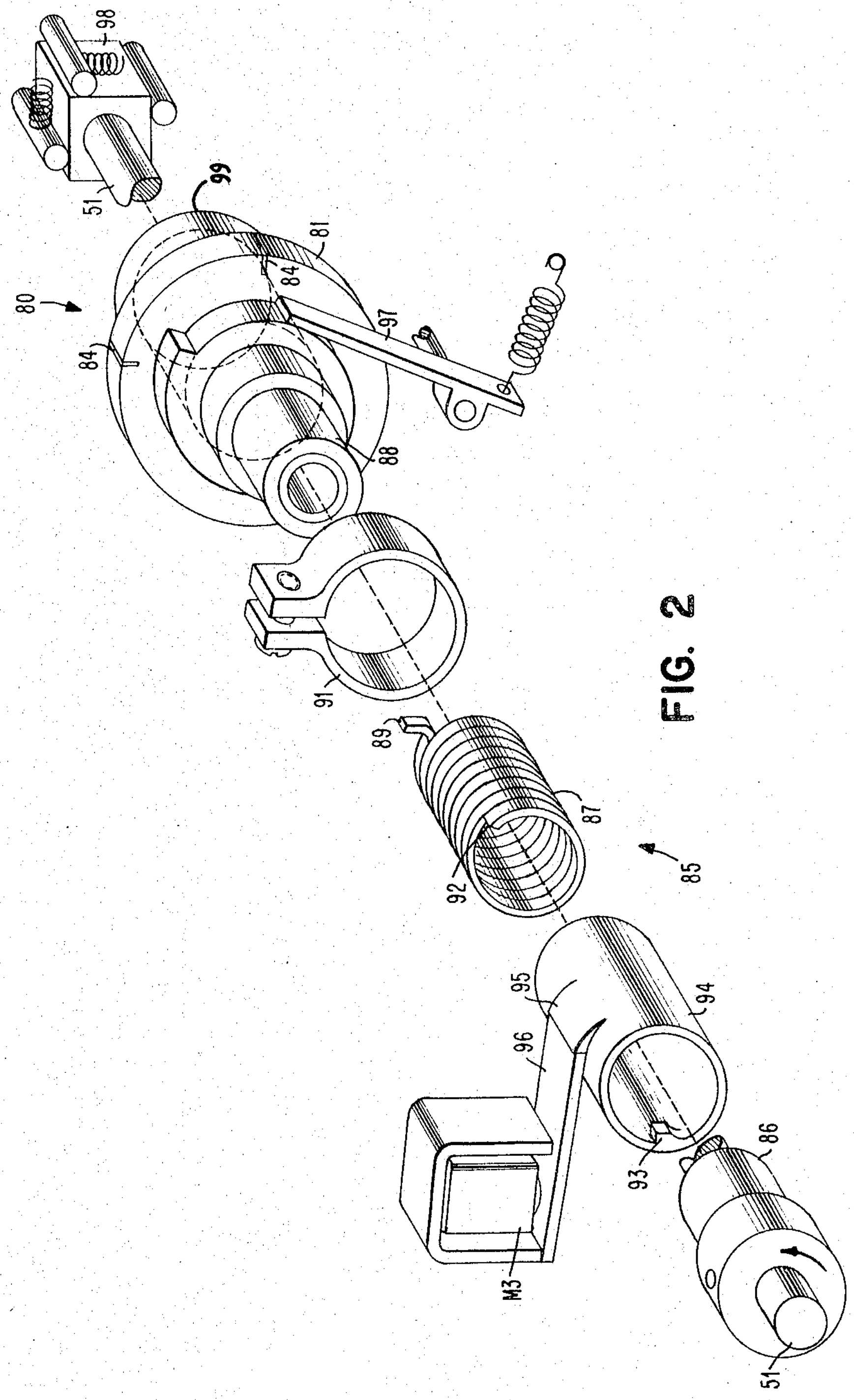
FIG. 2 is an exploded isometric view of the clutch and emitter of the document transport control apparatus.

The clutch 85 controlled by the magnet M3 is shown in detail in FIG. 2. The clutch 85 is essentially a spring clutch consisting of a spring drum element 86 suitably secured to shaft 51. Helical spring 87 embraces a section of the spring drum 86 and a section of spring drum 88 to which the emitter disc 81 is attached. Spring tab 89 is held by spring clamp 91 which is suitably secured to another section of the spring drum 88. The opposite end 92 of spring 87 is adapted to engage spring release tab 93 of control sleeve 94. When magnet M3 is de-energized, its armature 96 engages the end surface of stop lug 95 formed on the outer periphery of control sleeve 94. When the armature 96 is engaged with the stop lug 95, spring release tab 93 abuts against end 92 of spring 87 whereby the spring 87 is released from spring drum 86 which is attached to the shaft 51. Spring operated latch 97 prevents the emitter disc 81 from moving away in an opposite direction from the stop position. Element 98 is an over-running clutch. Over-running clutch 98 is attached to shaft 51 in a position to reside within sleeve 99 extending from one side of the emitter disc 81. The over-running clutch 98 functions to prevent the emitter disc 81 from being over-driven and thus out of synchronization with the leading edge of a document once the two have been synchronized. The spring clutch 85 is particularly suitable for this invention because the emitter disc 81 is coupled to the shaft 51 with no relative movement after the shaft 51 begins to turn. The emitter disc 81 always starts out from a home position and consequently the home position is synchronized to the leading edge of the document.

The emitter disc 81, in FIG. 1, in this particular example, is provided with markings 84 which are sensed by light source 82 and light sensitive element 83. The output of the light sensitive element 83 is connected to the input of amplifier 119, FIG. 5, which has its output connected to an input of logical OR circuit 112. Since the eject flip-flop 115 was reset when detector 21 detected the leading edge of the document entering into the reading station 20, it will still be reset unless there has been an eject signal from either system control 100 or reader control 200. Hence, in the absence of eject flip-flop 115 being set by signals from system control 100 or reader control 200, logical AND circuit 113 will be conditioned to pass the signal developed by emitter 80 whereby the start-stop latch 102 is reset and magnet driver 104 is activated to energize stop magnet M2. Thus the document 10 is advanced relative to the reading station 20 whereby a new section of the document comes into reading position, see FIG. 4. In other words, the document 10 is indexed a precise amount within the reading station 20 with respect to its leading edge. The emitter disc 81 remains coupled to shaft 51 because the magnet M3 is still energized. The emit flip-flop 117 is reset under control of eject flip-flop 115. Eject flip-flop 115 will not be reset again until after the document has been ejected from the reading station 20 and the leading edge of a subsequent document has been detected by document detector 21.

The eject signal can come from either system control 100 or reader control 200 and it is passed by a logical OR circuit 120 which has its output connected to the set terminal of eject flip-flop 115. When the eject flip-flop 115 is set, logical AND circuit 113 is de-conditioned and it cannot pass a signal to reset the start-stop latch 102. Additionally, with the eject flip-flop 115 reset, the emit flip-flop 117 becomes reset and consequently, the magnet driver 118 becomes de-activated and the magnet M3 becomes de-energized whereby the emitter disc 81 is decoupled from shaft 51 which rotates to drive the ejected document by means of the belts 26 into the continuously running transport section 18. The transport section 18 then carries the document to the stacker section 30. A selectively operable selector plate 19 if operated will deflect the document into stacker 31 and if unoperated, the document enters stacker 32.

Figure 3:
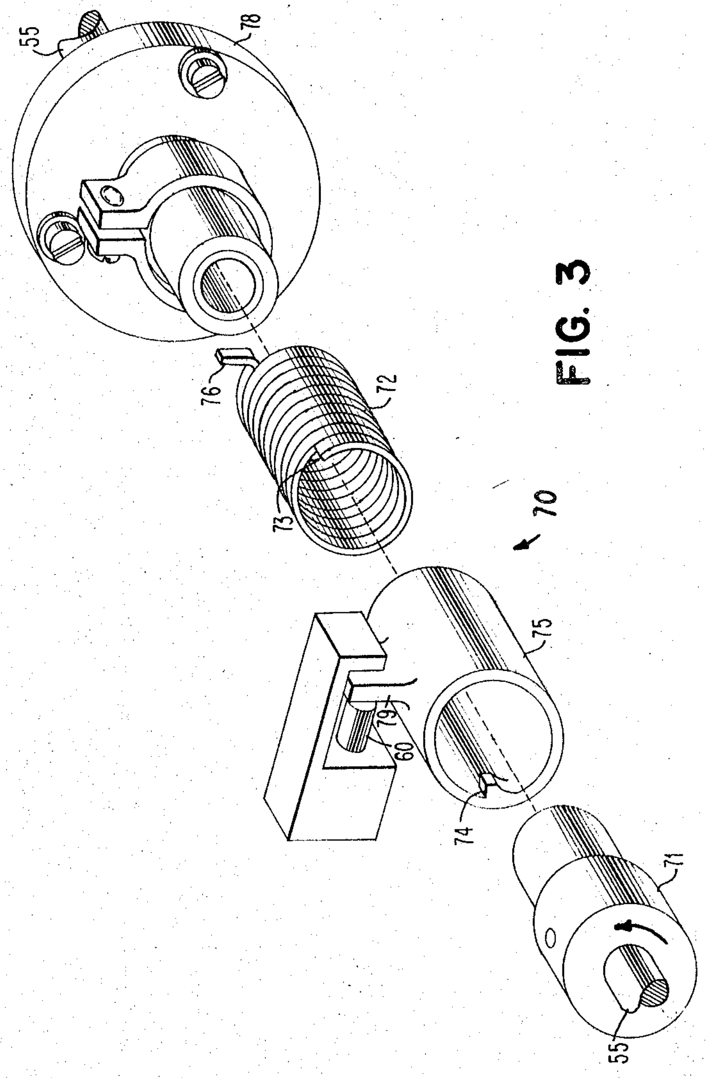
FIG. 3 is an exploded isometric view of the helical spring brake for the hydraulic motor output shaft.

Helical spring brake 70, FIG. 3, holds shaft 55 against movement when the hydraulic motor 56 is stopped.

Spring drum 71 is secured to shaft 55 and is embraced by helical spring 72 which has an end 73 for engaging spring release tab 74 of spring actuating sleeve 75 and an end 76 held by clamp 77 which is attached to frame element 78. The spring actuating sleeve 75 is operated by piston 60 whenever the motor 56 is started. Piston 60 engages tab 79 projecting from the outer periphery of the spring actuating sleeve 75 and moves the same as the motor 56 operates whereby spring release tab 74 moves end 73 to release the grip of the spring 72 from drum 71 and thus shaft 55 is free to rotate. When the motor 56 is stopped, the force of the spring 72 causes end 73 to operate on tab 74 so as to rotate sleeve 75 and tightly embrace the drum 71 and thus shaft 55 is held in an arrested position.

MODE OF OPERATION

The operation of the invention will be best understood with reference to FIGS. 1, 4 and 5. It should be realized that the invention applies equally as well to apparatus which has a work station other than a reading station and which has a different type of apparatus for transporting the workpiece or document. Also, the emitter 80 could be other than a photo-electric emitter such as a magnetic emitter or a wiper contact type of emitter.

Picker belt 12 will pick the top-most document 10 from the stack and advance it between belts 13 and 14. Feed belt 13 advances the top-most document between the first set of aligner rolls 15 and cooperating rolls 16. The first document continues to be advanced by rolls 15 and 16 and when the detector 21 detects the leading edge of this document, it emits an impulse which, after being amplified by amplifier 110, resets eject flip-flop 115. This impulse is then delayed by delay 111 whereby the leading edge of the document can be precisely stopped within the reading station 20. The signal from delay 111 is passed by logical OR circuit 112 to logical AND circuit 113 which will be conditioned at this time because eject flip-flop 115 was reset. Logical AND circuit 113 passes the signal to reset the start-stop latch 102. With the start-stop latch 102 reset, magnet driver 104 becomes activated and magnet M2 becomes energized whereby valve 58 is shifted to a position to block the discharge of fluid from motor 56 and motor 56 is thus stopped. Motor 56 decelerates as fluid pressure builds up in line 63. The fluid pressure in line 64 decays and the helical spring brake 70 moves the piston 60 through the spring 72 which then tightly embraces the drum 71 attached to shaft 55 to assist in the deceleration thereof and then hold the shaft 55 in the stopped position. Of course, the shaft 51 is also stopped, and since the emit flip-flop 117 is set from the pulse passing from delay 116 which received the pulse from delay 111, the magnet driver 118 is activated and the magnet M3 becomes energized. Delay 116 functions to permit the transport shaft 51 to decelerate and settle down before the emitter disc 81 is clutched thereto. Thus the home position of the emitter 80 is synchronized with the leading edge of the document 10 which is at rest within reading station 20.

After the portion of the document within reading station 20 has been read, reader control 200 emits a GO signal which is passed by logical OR circuit 101 to set the start-stop latch 102. Under this condition, magnet M2 becomes de-energized and magnet M1 becomes energized, whereby valve 58 is shifted to open the discharge path from motor 56 to reservoir 59. Thus the motor 56 will be operated by pump 57 and shaft 51 will be driven via shaft 55, pulley 54, belt 53 and pulley 52. As the motor 56 accelerates, fluid pressure builds up in line 64. This fluid pressure operates on piston 60 to move the same. Movement of piston 60 operates actuating sleeve 75 so that spring release tab 74 moves end 73 of spring 72 and thus spring 72 releases its grip upon drum 71 and shaft 55 is free to rotate.

The emitter disc 81 now clutched to the shaft 51 will rotate therewith and when an emitter element 84 is detected by light sensitive element 83, a signal is developed and amplified by amplifier 119. The amplified signal is passed by logical OR circuit 112 to logical AND circuit 113 which passes the signal to reset the start-stop latch 102. With the start-stop latch 102 reset, magnet M1 becomes de-energized and magnet M2 becomes energized. Thus valve 58 is again shifted so as to effectively stop the operation of motor 56 and thus stop the document with a new portion thereof precisely registered relative to the reading station 20. Spring brake 70 will hold shaft 55 from movement and consequently shaft 51 will be held against movement. The number of indexes of the document can vary as desired. In this example, as seen in FIG. 4, the document is indexed twice. Further, if desired, the incremental distance of each index could be varied by changing the distance between emitter elements 84.

If for some reason it were desired to eject the document from the reading station before all indexes were made, an eject signal would be emitted from either system control 100 or reader control 200 and would be passed by logical OR circuit 120 to set the eject flip-flop 115. With the eject flip-flop 115 set, a signal cannot be passed by logical AND circuit 113 to reset the start-stop latch 102. Consequently, when a GO signal is emitted from either system control 100 or reader control 200, the start-stop latch 102 will be set whereby magnet M1 becomes energized and remains energized until the eject flip-flop 115 is reset by a signal developed when detector 21 detects the leading edge of the next document. The emitter disc 81 is decoupled from the shaft 51 when magnet M3 becomes de-energized. Magnet M3 is de-energized when the emit flip-flop 117 is reset. The emit flip-flop 117 is reset as the eject flip-flop 115 becomes reset. Thus, the emitter disc 81 will return to its home position and become synchronized with the leading edge of the next document after the shaft 51 is subsequently stopped.

From the foregoing it is seen that the invention provides improved control apparatus. It is further seen that the invention provides improved control apparatus for a document transport which is synchronized to documents fed asynchronously. Further, it is seen that the invention enables asynchronously fed documents to be precisely indexed in predetermined increments through a work station. It is also seen that the invention permits a workpiece such a document to be both indexed within and ejected from a work station.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Control apparatus for document transports comprising:

detecting means for detecting the leading edge of a document prior to entry thereof into a work station;

stopping means responsive to said detecting means for stopping said document with its leading edge in a predetermined position within said work station;

emitter means responsive to said detecting means to couple with said transport and thereafter turn therewith to generate a signal for activating said stopping means; and means for transmitting signals from said emitter means to said stopping means.

2. The control apparatus of claim 1 wherein said detecting means consists of a light source and a light responsive element.

3. The control apparatus of claim 1 wherein said emitter means consists of a disc having arcuately spaced differentially light reflective markings;

a light source positioned to illuminate said markings; and a light sensitive element positioned to be activated by light waves reflected by said markings.

4. Control apparatus for a transport comprising:

operating means for selectively operating said transport;

detecting means fixed at a predetermined position relative to the transport path for generating a control signal in response to detecting the leading edge of a document;

means for transmitting said control signal from said said detecting means to said operating means whereby the same responsively operates to stop said transport and thereby stop said document with the leading edge thereof at a predetermined position in the transport path;

an emitter for generating control signals at an output;

a selectively operable clutch for operatively coupling said emitter to said transport; and means for transmitting said control signal to said clutch to operate the same to couple said emitter to said transport in synchronism with the leading edge of said document.

5. The control apparatus of claim 4 further comprising:

means for electrically connecting the output of said emitter to said operating means whereby the signals from said emitter further control said operating means.

6. The control apparatus of claim 4 further comprising:

signal delay means connected between said detecting means and said means for transmitting said control signal from said detecting means to said operating means.

7. The control apparatus of claim 4 further comprising:

signal delay means connected between said detecting means and said clutch to delay the operation of said clutch to permit the transport to settle down prior to coupling said emitter thereto.

8. Control apparatus for a transport comprising:

operating means for selectively operating said transport;

detecting means fixed at a predetermined position relative to the transport path for generating a stop signal in response to detecting the leading edge of a document;

first signal delay means connected between said detecting means and said operating means whereby after the detection of the leading edge of a document, said operating means stops said transport to stop said document with the leading edge thereof at a predetermined position from the position at which the leading edge of the document had been detected;

an emitter for generating control signals at an output;

a selectively operable clutch for operatively coupling said emitter to said transport; and second signal delay means connected between said detecting means and said clutch to delay the operation of said clutch to permit the transport to settle down prior to coupling said emitter thereto.

9. The control apparatus of claim 8 further comprising:

means for electrically connecting the output of said emitter to said operating means whereby the signals from said emitter further control said operating means.

10. In an article transport system, a selectively operable transport for transporting articles from a supply to a work station and from said work station to a stacking station;

control means for controlling the starting and stopping of said transport;

detecting means positioned ahead of said work station and operative to generate a signal in response to detecting articles entering said work station;

means for electrically connecting said detecting means to said control means;

an emitter for generating control signals at an output;

a selectively operable clutch for operatively coupling said emitter to said transport; and means for electrically connecting said detecting means to said clutch to operate the same and thereby couple said emitter to said transport.

11. The transport system of claim 10 further comprising:

means for electrically connecting the output of said emitter to said control means.

12. Control apparatus for transports comprising:

detecting means positioned relative to the transport path for detecting articles entering a work station and operative to generate a control signal upon detecting an article;

transport control means for controlling at least the stopping of said transport, said control means being electrically connected to said detecting means and operatively responsive to a control signal therefrom to stop said transport whereby the detected article is stopped at a predetermined position relative to said work station;

an emitter normally residing in a home position and connectable to said transport; and means operatively connected to said detecting means for connecting said emitter to said transport.

13. The transport control apparatus of claim 12 wherein said connecting means connects said emitter to said transport when the same is stopped whereby the home position of said emitter is synchronized with the position of the stopped article in the work station.

14. The transport control apparatus of claim 12 wherein said connecting means includes a control magnet; and a spring clutch operably controlled by said magnet.

References Cited by the Examiner

UNITED STATES PATENTS

| | | | |
|---|---|---|---|
| 2,731,621 | 1/1956 | Sontheimer | 209—111.7 |
| 3,158,368 | 11/1964 | Shelley | 271—53 |
| 3,179,404 | 4/1965 | Felts | 271—57 |

M. HENSON WOOD, Jr., *Primary Examiner.*

R. A. SCHACHER, *Assistant Examiner.*